3,064,001
METHOD FOR PREPARING PIPERAZINES
Norman B. Godfrey, Austin, Tex., assignor to Jefferson Chemical Co., Inc., Houston, Tex., a corporation of Delaware
No Drawing. Original application July 30, 1957, Ser. No. 675,036. Divided and this application July 13, 1959, Ser. No. 826,475
7 Claims. (Cl. 260—268)

This invention relates to a method for preparing piperazine and alkyl substituted piperazines by the reaction of an alkylene diamine with an alkanolamine. This application is a divisional application of Serial No. 675,036 filed July 30, 1957.

In accordance with this process, an alkylene diamine is reacted with an alkanolamine at an elevated temperature and a superatmospheric pressure in the presence of hydrogen and a hydrogenation catalyst, said reaction being represented by the formula:

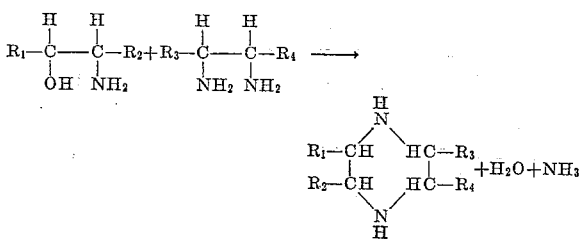

in which $R_1$, $R_2$, $R_3$ and $R_4$ represent a member from the group consisting of hydrogen and alkyl radicals having from 1 to 8 carbon atoms. Preferably, the alkyl radical will be one having from 1 to about 3 carbon atoms.

The alkanolamine, as indicated by the above formula, must be one having its functional hydroxyl and amino groups attached to adjacent carbon atoms. Typical starting materials of this class which may be employed include monoethanolamine, monoisopropanolamine, 1-aminobutanol-2, and 3-aminobutanol-2. In general, 2-alkanolamines are preferred.

The alkylene diamine must be a vicinal diamine having its amino groups attached to adjacent carbon atoms. Diamines which may be employed include ethylene diamine, α propylene diamine, 1,2-diaminobutane and 2,3-diaminobutane.

This process is conducted in the liquid phase at an elevated temperature and at a superatmospheric pressure. While the temperature is not considered critical, the reaction should be conducted between about 150° C. and about 400° C. A preferred temperature range for the reaction is from about 200° C. to about 275° C. Relatively high pressures are employed ranging from about 30 to about 400 atmospheres with the preferred pressure range being from about 65 to about 225 atmospheres.

Ammonia is preferably employed for the efficient operation of this process. Thus, while ammonia is not required to satisfy the chemical balance in the reaction, nevertheless, its presence has been observed to sharply increase the yield of the piperazine product. The molar amount of ammonia employed in the process should be substantially in excess of the molar amount of the alkanolamine employed. Optimum yields of piperazine will be obtained when the molar ratio of ammonia to the alkanolamine is at least about 2 to 1 and preferably greater than 3 to 1.

The presence of hydrogen is critical to effect conversion to a piperazine according to this process. Thus, it is necessary that the hydrogen partial pressure employed amount to a substantial part of the total pressure of the reaction. For example, hydrogen should constitute at least 10 and preferably between 20 and 200 atmospheres of the total pressure employed in the reaction. When hydrogen is to be introduced into a reaction vessel in a batch operation, it is preferred practice to sweep the vessel clean with a portion of hydrogen gas and thereafter to introduce a predetermined amount of hydrogen into the sealed vessel. When the vessel and its contents are subsequently heated to bring the temperature up to the reaction temperature, the hydrogen and other reactants contained therein will bring the total operating pressure within the range specified for the reaction.

A hydrogenation catalyst is essential to promote combination of the alkanolamine with the alkylene diamine. Preferred hydrogenation catalysts consist essentially of one or more of the metals selected from the group consisting of copper, nickel and cobalt and their oxides. A simple or mixed metal oxide catalyst of this type may conveniently be prepared by ignition of the corresponding metal nitrate or carbonate salts.

When oxides of nickel, copper and cobalt are employed as the catalyst, the oxides are reduced to metal or lower oxides by the hydrogen present in the reaction zone. Alternatively, however, these oxides may be prereduced by passing a stream of hydrogen over the oxides while heating them at an elevated temperature generally from about 200 to 400° C.

The catalyst may be employed with minor amounts of at least one normally non-reducible metal oxide from the group consisting of chromium oxide, molybdenum oxide, manganese oxide, and thorium oxide. These non-reducible oxides exhibit the property of promoting the activity of the catalyst.

A specific preferred catalyst composition consists of about 75% nickel oxide, 22% copper oxide and 3% chromium oxide. On reduction, this catalyst will, of course, consist of metallic nickel and copper along with chromium oxide.

The catalyst may be employed in conjunction with an inert support such as silica, Filtros and alumina but is suitable either with or without a support for use in a batch process or in a fixed bed continuous flow process. In a batch process, the amount of catalyst employed generally will be between about 5% and 22% by weight of the reactants.

While some break down occurs in this reaction involving higher molecular weight alkanolamines with alkylene diames with the production of piperazine, the present invention represents a convenient process for the manufacture of unsymmetrically substituted piperazines.

The following examples illustrate the practice of this invention.

Example I

One mol each of ethylenediamine (71% aqueous solution) and monoethanolamine were charged into a stainless steel rocking autoclave bomb of 1400 ml. capacity, together with a catalyst prepared by reducing 10 g. of nickel-copper-chromium oxide (76% NiO, 22% CuO, 2% $Cr_2O_3$) in a stream of hydrogen at about 220° C. The bomb was closed and purged with hydrogen. Four mols liquid ammonia was introduced followed by hydrogen sufficient to bring the total pressure to 500 p.s.i.g. The bomb and its contents were brought to a temperature of 240° C. and agitated for one hour, during which a maximum pressure of 3275 p.s.i.g. was reached. The cooled reaction mixture was filtered and fractionally distilled. Piperazine was obtained amounting to 12% conversion and 41% yield based on unrecovered ethylenediamine and monoethanolamine combined.

Example II

One mol of each of 1,2-propylenediamine and monoethanolamine were subjected to the reaction conditions of Example I except that 100 g. water was added to the starting materials and the amount of catalyst was doubled. The crude product, obtained in 49% yield as a fraction distilling chiefly between 152.5 and 154.5° C., consisted of 2-methylpiperazine along with minor amounts of piperazine, trans 2, 5-dimethylpiperazine, and other amines.

Example III

One mole each of anhydrous ethylenediamine and monoisopropanolamine were subjected to a reaction as described in Example I except that reaction time was two hours and the catalyst was prepared by reducing with hydrogen 20 g. of a copper oxide-chromium oxide catalyst, (93% CuO, 7% $Cr_2O_3$), at 315° C. The ammonia was omitted. The cude fraction distilling between 148° and 175° C., amounting to 26.4 g., contained 2-methylpiperazine as the major component, together with minor amounts of piperazine and trans-2,5-dimethylpiperazine.

Obviously many modifications and variations of the invention, as hereinbefore set forth, may be made without departing from the spirit and scope thereof, and therefore only such limitations should be imposed as are indicated in the appended claims.

I claim:

1. A process for preparing a piperazine which comprises reacting in the liquid phase, hydrogen, an alkylene diamine of the formula:

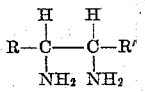

wherein R and R' are selected from the group consisting of hydrogen and lower alkyl radicals with an alkanolamine of the formula:

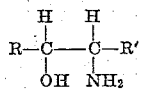

wherein R and R' are selected from the group consisting of hydrogen and lower alkyl radicals within the temperature range of 150° C. to 400° C., under a superatmospheric pressure within the range of about 30 to 400 atmospheres, including a hydrogen partial pressure within the range of about 20 to 200 atmospheres and in the presence of a hydrogenation catalyst selected from the group consisting of copper, nickel and cobalt and their oxides.

2. A process for preparing a piperazine which comprises reacting in the liquid phase, hydrogen, an alkylene diamine of the formula:

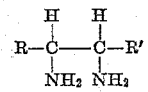

wherein R and R' are selected from the group consisting of hydrogen and lower alkyl radicals with an alkanolamine of the formula:

$$R-\underset{\underset{OH}{|}}{\overset{\overset{H}{|}}{C}}-\underset{\underset{NH_2}{|}}{\overset{\overset{H}{|}}{C}}-R'$$

wherein R and R' are selected from the group consisting of hydrogen and lower alkyl radicals, within the temperature range of 200° C. to 275° C., under a superatmospheric pressure within the range of about 30 to about 400 atmospheres, including a hydrogen partial pressure within the range of about 20 to 200 atmospheres and in the presence of a hydrogenation catalyst selected from the group consisting of copper, nickel and cobalt and their oxides.

3. A process according to claim 2 in which said catalyst consists of 75% nickel oxide, 22% copper oxide and 3% chromium oxide.

4. A process according to claim 2 in which ammonia is employed in the proportion of at least 3 mols of ammonia per mol of said alkanolamine.

5. A process for preparing piperazine which comprises reacting in the liquid phase, hydrogen, ethylene diamine, and monoethanolamine at a temperature in the range of 200° to 275° C. under a superatmospheric pressure within the range of about 30 to about 400 atmospheres, including a hydrogen partial pressure within the range of about 20 to 200 atmospheres and in the presence of a hydrogenation catalyst selected from the group consisting of copper, nickel, and cobalt and their oxides.

6. A process for preparing 2-methylpiperazine which comprises reacting in the liquid phase, hydrogen, 1,2, propylene diamine and monoethanolamine at a temperature in the range of 200° C. to 275° C. under a superatmospheric pressure within the range of about 30 to about 400 atmospheres, including a hydrogen partial pressure within the range of about 20 to about 200 atmospheres and in the presence of a catalyst selected from the group consisting of copper, nickel and cobalt and their oxides.

7. A process for preparing 2-methylpiperazine which comprises reacting in the liquid phase, hydrogen, ethylenediamine and monoisopropanolamine at a temperature within the range of 200° C. to 275° C. under a superatmospheric pressure within the range of about 30 to about 400 atmospheres, including a hydrogen partial pressure within the range of about 20 to 200 atmospheres and in the presence of a catalyst selected from the group consisting of copper, nickel and cobalt and their oxides.

References Cited in the file of this patent

UNITED STATES PATENTS

| | | |
|---|---|---|
| 2,412,209 | Dickey et al. | Dec. 10, 1946 |
| 2,519,560 | Fowler | Aug. 22, 1950 |
| 2,636,032 | Weston et al. | Apr. 21, 1953 |
| 2,754,330 | Schreyer | July 10, 1956 |
| 2,861,995 | MacKenzie | Nov. 25, 1958 |

OTHER REFERENCES

Ishiguro: J. Pharm. Soc. (Japan), vol. 77, pages 1051–1054.